US012490023B2

(12) United States Patent
Shumard et al.

(10) Patent No.: US 12,490,023 B2
(45) **Date of Patent: *Dec. 2, 2025**

(54) ADJUSTABLE LOBE SHAPE FOR ARRAY MICROPHONES

(71) Applicant: Shure Acquisition Holdings, Inc., Niles, IL (US)

(72) Inventors: Brent Robert Shumard, Mount Prospect, IL (US); Mathew T. Abraham, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,595

(22) Filed: Apr. 18, 2022

(65) Prior Publication Data

US 2022/0386022 A1 Dec. 1, 2022

Related U.S. Application Data

(63) Continuation of application No. 16/576,549, filed on Sep. 19, 2019, now Pat. No. 11,310,596.

(Continued)

(51) Int. Cl.

*H04R 19/04* (2006.01)
*H04R 1/40* (2006.01)
*H04R 3/00* (2006.01)

(52) U.S. Cl.

CPC ............. *H04R 3/005* (2013.01); *H04R 1/406* (2013.01); *H04R 19/04* (2013.01); *H04R 2201/003* (2013.01); *H04R 2430/20* (2013.01)

(58) Field of Classification Search

CPC ........ H04R 3/005; H04R 1/406; H04R 19/04; H04R 2201/003; H04R 2430/20; H04R 2201/401; H04R 2201/405

(Continued)

(56) References Cited

U.S. PATENT DOCUMENTS

| | | | |
|---|---|---|---|
| 1,535,408 | A | 4/1925 | Fricke |
| 1,540,788 | A | 6/1925 | Mcclure |
| 1,965,830 | A | 7/1934 | Hammer |
| 2,075,588 | A | 3/1937 | Meyers |

(Continued)

FOREIGN PATENT DOCUMENTS

| | | |
|---|---|---|
| CA | 2359771 | 4/2003 |
| CA | 2475283 | 1/2005 |

(Continued)

OTHER PUBLICATIONS

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021.

(Continued)

*Primary Examiner* — Carolyn R Edwards
*Assistant Examiner* — Friedrich Fahnert
(74) *Attorney, Agent, or Firm* — ALSTON & BIRD LLP

(57) ABSTRACT

Array microphone systems and methods having adjustable lobe shapes are provided. The lobe shapes of pickup patterns in an array microphone may be adjusted by weighting the audio signals of subsets of the microphone elements that make up the array. The lobe shapes may be adjusted in a direction independent of a steering vector of the lobe. Users may have greater control of lobes which can result in more efficient and optimal coverage of audio sources in environments.

20 Claims, 7 Drawing Sheets

Related U.S. Application Data

(60) Provisional application No. 62/733,779, filed on Sep. 20, 2018.

(58) Field of Classification Search
USPC ........................................................ 381/92
See application file for complete search history.

(56) References Cited

U.S. PATENT DOCUMENTS

| | | | |
|---|---|---|---|
| 2,113,219 | A | 4/1938 | Olson |
| 2,164,655 | A | 7/1939 | Kleerup |
| D122,771 | S | 10/1940 | Doner |
| 2,233,412 | A | 3/1941 | Hill |
| 2,268,529 | A | 12/1941 | Stiles |
| 2,343,037 | A | 2/1944 | Adelman |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | Mcmillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | McGee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Goerike |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |
| 5,612,929 | A * | 3/1997 | Lopes .................. G01S 7/6263 367/107 |
| 5,633,936 | A | 5/1997 | Oh |
| 5,645,257 | A | 7/1997 | Ward |

(56) References Cited

U.S. PATENT DOCUMENTS

| | | | |
|---|---|---|---|
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Jimen |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,120,269 | B2 | 10/2006 | Lowell |
| 7,130,309 | B2 | 10/2006 | Pianka |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Popovic |
| D546,318 | S | 7/2007 | Yoon |
| D546,814 | S | 7/2007 | Takita |
| D547,748 | S | 7/2007 | Tsuge |
| 7,239,714 | B2 | 7/2007 | de Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | Mischel |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |
| 7,881,486 | B1 | 2/2011 | Killion |
| 7,894,421 | B2 | 2/2011 | Kwan |
| D636,188 | S | 4/2011 | Kim |
| 7,925,006 | B2 | 4/2011 | Hirai |

(56) References Cited

U.S. PATENT DOCUMENTS

| | | | |
|---|---|---|---|
| 7,925,007 B2 | 4/2011 | Stokes | |
| 7,936,886 B2 | 5/2011 | Kim | |
| 7,970,123 B2 | 6/2011 | Beaucoup | |
| 7,970,151 B2 | 6/2011 | Oxford | |
| D642,385 S | 8/2011 | Lee | |
| D643,015 S | 8/2011 | Kim | |
| 7,991,167 B2 | 8/2011 | Oxford | |
| 7,995,768 B2 | 8/2011 | Miki | |
| 8,000,481 B2 | 8/2011 | Nishikawa | |
| 8,005,238 B2 | 8/2011 | Tashev | |
| 8,019,091 B2 | 9/2011 | Burnett | |
| 8,041,054 B2 | 10/2011 | Yeldener | |
| 8,059,843 B2 | 11/2011 | Hung | |
| 8,064,629 B2 | 11/2011 | Jiang | |
| 8,085,947 B2 | 12/2011 | Haulick | |
| 8,085,949 B2 | 12/2011 | Kim | |
| 8,095,120 B1 | 1/2012 | Blair | |
| 8,098,842 B2 | 1/2012 | Florencio | |
| 8,098,844 B2 | 1/2012 | Elko | |
| 8,103,030 B2 | 1/2012 | Barthel | |
| 8,109,360 B2 | 2/2012 | Stewart, Jr. | |
| 8,112,272 B2 | 2/2012 | Nagahama | |
| 8,116,500 B2 | 2/2012 | Oxford | |
| 8,121,834 B2 | 2/2012 | Rosec | |
| D655,271 S | 3/2012 | Park | |
| D656,473 S | 3/2012 | Laube | |
| 8,130,969 B2 | 3/2012 | Buck | |
| 8,130,977 B2 | 3/2012 | Chu | |
| 8,135,143 B2 | 3/2012 | Ishibashi | |
| 8,144,886 B2 | 3/2012 | Ishibashi | |
| D658,153 S | 4/2012 | Woo | |
| 8,155,331 B2 | 4/2012 | Nakadai | |
| 8,170,882 B2 | 5/2012 | Davis | |
| 8,175,291 B2 | 5/2012 | Chan | |
| 8,175,871 B2 | 5/2012 | Wang | |
| 8,184,801 B1 | 5/2012 | Hamalainen | |
| 8,189,765 B2 | 5/2012 | Nishikawa | |
| 8,189,810 B2 | 5/2012 | Wolff | |
| 8,194,863 B2 | 6/2012 | Takumai | |
| 8,199,927 B1 | 6/2012 | Raftery | |
| 8,204,198 B2 | 6/2012 | Adeney | |
| 8,204,248 B2 | 6/2012 | Haulick | |
| 8,208,664 B2 | 6/2012 | Iwasaki | |
| 8,213,596 B2 | 7/2012 | Beaucoup | |
| 8,213,634 B1 | 7/2012 | Daniel | |
| 8,219,387 B2 | 7/2012 | Cutler | |
| 8,229,134 B2 | 7/2012 | Duraiswami | |
| 8,233,352 B2 | 7/2012 | Beaucoup | |
| 8,243,951 B2 | 8/2012 | Ishibashi | |
| 8,244,536 B2 | 8/2012 | Arun | |
| 8,249,273 B2 | 8/2012 | Inoda | |
| 8,259,959 B2 | 9/2012 | Marton | |
| 8,275,120 B2 | 9/2012 | Stokes, III | |
| 8,280,728 B2 | 10/2012 | Chen | |
| 8,284,949 B2 | 10/2012 | Farhang | |
| 8,284,952 B2 | 10/2012 | Reining | |
| 8,286,749 B2 | 10/2012 | Stewart | |
| 8,290,142 B1 | 10/2012 | Lambert | |
| 8,291,670 B2 | 10/2012 | Gard | |
| 8,297,402 B2 | 10/2012 | Stewart | |
| 8,315,380 B2 | 11/2012 | Liu | |
| 8,331,582 B2 | 12/2012 | Steele | |
| 8,345,898 B2 | 1/2013 | Reining | |
| 8,355,521 B2 | 1/2013 | Larson | |
| 8,370,140 B2 | 2/2013 | Vitte | |
| 8,379,823 B2 | 2/2013 | Ratmanski | |
| 8,385,557 B2 | 2/2013 | Tashev | |
| D678,329 S | 3/2013 | Lee | |
| 8,395,653 B2 | 3/2013 | Feng | |
| 8,403,107 B2 | 3/2013 | Stewart | |
| 8,406,436 B2 | 3/2013 | Craven | |
| 8,428,661 B2 | 4/2013 | Chen | |
| 8,433,061 B2 | 4/2013 | Cutler | |
| D682,266 S | 5/2013 | Wu | |
| 8,437,490 B2 | 5/2013 | Marton | |
| 8,443,930 B2 | 5/2013 | Stewart, Jr. | |
| 8,447,590 B2 | 5/2013 | Ishibashi | |
| 8,472,639 B2 | 6/2013 | Reining | |
| 8,472,640 B2 | 6/2013 | Marton | |
| D685,346 S | 7/2013 | Szymanski | |
| D686,182 S | 7/2013 | Ashiwa | |
| 8,479,871 B2 | 7/2013 | Stewart | |
| 8,483,398 B2 | 7/2013 | Fozunbal | |
| 8,498,423 B2 | 7/2013 | Thaden | |
| D687,432 S | 8/2013 | Duan | |
| 8,503,653 B2 | 8/2013 | Ahuja | |
| 8,515,089 B2 | 8/2013 | Nicholson | |
| 8,515,109 B2 | 8/2013 | Dittberner | |
| 8,526,633 B2 | 9/2013 | Ukai | |
| 8,553,904 B2 | 10/2013 | Said | |
| 8,559,611 B2 | 10/2013 | Ratmanski | |
| D693,328 S | 11/2013 | Goetzen | |
| 8,583,481 B2 | 11/2013 | Viveiros | |
| 8,599,194 B2 | 12/2013 | Lewis | |
| 8,600,443 B2 | 12/2013 | Kawaguchi | |
| 8,605,890 B2 | 12/2013 | Zhang | |
| 8,620,650 B2 | 12/2013 | Walters | |
| 8,631,897 B2 | 1/2014 | Stewart | |
| 8,634,569 B2 | 1/2014 | Lu | |
| 8,638,951 B2 | 1/2014 | Zurek | |
| D699,712 S | 2/2014 | Bourne | |
| 8,644,477 B2 | 2/2014 | Gilbert | |
| 8,654,955 B1 | 2/2014 | Lambert | |
| 8,654,990 B2 | 2/2014 | Faller | |
| 8,660,274 B2 | 2/2014 | Wolff | |
| 8,660,275 B2 | 2/2014 | Buck | |
| 8,670,581 B2 | 3/2014 | Harman | |
| 8,672,087 B2 | 3/2014 | Stewart | |
| 8,675,890 B2 | 3/2014 | Schmidt | |
| 8,675,899 B2 | 3/2014 | Jung | |
| 8,676,728 B1 | 3/2014 | Velusamy | |
| 8,682,675 B2 | 3/2014 | Togami | |
| 8,724,829 B2 | 5/2014 | Visser | |
| 8,730,156 B2 | 5/2014 | Weising | |
| 8,744,069 B2 | 6/2014 | Cutler | |
| 8,744,101 B1 | 6/2014 | Burns | |
| 8,755,536 B2 | 6/2014 | Chen | |
| 8,787,560 B2 | 7/2014 | Buck | |
| 8,811,601 B2 | 8/2014 | Mohammad | |
| 8,818,002 B2 | 8/2014 | Tashev | |
| 8,824,693 B2 | 9/2014 | Åhgren | |
| 8,842,851 B2 | 9/2014 | Beaucoup | |
| 8,855,326 B2 | 10/2014 | Derkx | |
| 8,855,327 B2 | 10/2014 | Tanaka | |
| 8,861,713 B2 | 10/2014 | Xu | |
| 8,861,756 B2 | 10/2014 | Zhu | |
| 8,873,789 B2 | 10/2014 | Bigeh | |
| D717,272 S | 11/2014 | Kim | |
| 8,886,343 B2 | 11/2014 | Ishibashi | |
| 8,893,849 B2 | 11/2014 | Hudson | |
| 8,898,633 B2 | 11/2014 | Bryant | |
| D718,731 S | 12/2014 | Lee | |
| 8,903,106 B2 | 12/2014 | Meyer | |
| 8,923,529 B2 | 12/2014 | Mccowan | |
| 8,929,564 B2 | 1/2015 | Kikkeri | |
| 8,934,640 B2 | 1/2015 | Goodwin | |
| 8,942,382 B2 | 1/2015 | Elko | |
| 8,965,546 B2 | 2/2015 | Visser | |
| D725,059 S | 3/2015 | Kim | |
| D725,631 S | 3/2015 | Mcnamara | |
| 8,976,977 B2 | 3/2015 | De | |
| 8,983,089 B1 | 3/2015 | Chu | |
| 8,983,834 B2 | 3/2015 | Davis | |
| D726,144 S | 4/2015 | Kang | |
| D727,968 S | 4/2015 | Onoue | |
| 9,002,028 B2 | 4/2015 | Haulick | |
| D729,767 S | 5/2015 | Lee | |
| 9,038,301 B2 | 5/2015 | Zelbacher | |
| 9,088,336 B2 | 7/2015 | Mani | |
| 9,094,496 B2 | 7/2015 | Teutsch | |
| D735,717 S | 8/2015 | Lam | |
| D737,245 S | 8/2015 | Fan | |
| 9,099,094 B2 | 8/2015 | Burnett | |
| 9,107,001 B2 | 8/2015 | Diethorn | |

(56) References Cited

U.S. PATENT DOCUMENTS 9,111,543 B2 8/2015 Åhgren
9,113,242 B2 8/2015 Hyun
9,113,247 B2 8/2015 Chatlani
9,126,827 B2 9/2015 Hsieh
9,129,223 B1 9/2015 Velusamy
9,140,054 B2 9/2015 Oberbroeckling
D740,279 S 10/2015 Wu
9,172,345 B2 10/2015 Kok
D743,376 S 11/2015 Kim
D743,939 S 11/2015 Seong
9,196,261 B2 11/2015 Burnett
9,197,974 B1 11/2015 Clark
9,203,494 B2 12/2015 Tarighat Mehrabani
9,215,327 B2 12/2015 Bathurst
9,215,543 B2 12/2015 Sun
9,226,062 B2 12/2015 Sun
9,226,070 B2 12/2015 Hyun
9,226,088 B2 12/2015 Pandey
9,232,185 B2 1/2016 Graham
9,237,391 B2 1/2016 Benesty
9,247,367 B2 1/2016 Nobile
9,253,567 B2 2/2016 Morcelli
9,257,132 B2 2/2016 Gowreesunker
9,264,553 B2 2/2016 Pandey
9,264,805 B2 2/2016 Buck
9,280,985 B2 3/2016 Tawada
9,286,908 B2 3/2016 Zhang
9,294,839 B2 3/2016 Lambert
9,301,049 B2 3/2016 Elko
D754,103 S 4/2016 Fischer
9,307,326 B2 4/2016 Elko
9,319,532 B2 4/2016 Bao
9,319,799 B2 4/2016 Salmon
9,326,060 B2 4/2016 Nicholson
D756,502 S 5/2016 Lee
9,330,673 B2 5/2016 Cho
9,338,301 B2 5/2016 Pocino
9,338,549 B2 * 5/2016 Haulick ................ G01S 15/003
9,354,310 B2 5/2016 Visser
9,357,080 B2 5/2016 Beaucoup
9,403,670 B2 8/2016 Schelling
9,426,598 B2 8/2016 Walsh
D767,748 S 9/2016 Nakai
9,451,078 B2 9/2016 Yang
D769,239 S 10/2016 Li
9,462,378 B2 10/2016 Kuech
9,473,868 B2 10/2016 Huang
9,479,627 B1 10/2016 Rung
9,479,885 B1 10/2016 Ivanov
9,489,948 B1 11/2016 Chu
9,510,090 B2 11/2016 Lissek
9,514,723 B2 12/2016 Silfvast
9,516,412 B2 12/2016 Shigenaga
9,521,057 B2 12/2016 Klingbeil
9,521,486 B1 12/2016 Barton
9,549,245 B2 1/2017 Frater
9,560,446 B1 1/2017 Chang
9,560,451 B2 1/2017 Eichfeld
9,565,493 B2 2/2017 Abraham
9,578,413 B2 2/2017 Sawa
9,578,440 B2 2/2017 Otto
9,589,556 B2 3/2017 Gao
9,591,123 B2 3/2017 Sorensen
9,591,404 B1 3/2017 Chhetri
D784,299 S 4/2017 Cho
9,615,173 B2 4/2017 Sako
9,628,596 B1 4/2017 Bullough
9,635,186 B2 4/2017 Pandey
9,635,474 B2 4/2017 Kuster
D787,481 S 5/2017 Tyss
D788,073 S 5/2017 Silvera
9,640,187 B2 5/2017 Niemisto
9,641,688 B2 5/2017 Pandey
9,641,929 B2 5/2017 Li
9,641,935 B1 5/2017 Ivanov
9,653,091 B2 5/2017 Matsuo
9,653,092 B2 5/2017 Sun
9,655,001 B2 5/2017 Metzger
9,659,576 B1 5/2017 Kotvis
D789,323 S 6/2017 Mackiewicz
9,674,604 B2 6/2017 Deroo
9,692,882 B2 6/2017 Mani
9,706,057 B2 7/2017 Mani
9,716,944 B2 7/2017 Yliaho
9,721,582 B1 8/2017 Huang
9,734,835 B2 8/2017 Fujieda
9,754,572 B2 9/2017 Salazar
9,761,243 B2 9/2017 Taenzer
D801,285 S 10/2017 Timmins
9,788,119 B2 10/2017 Vilermo
9,807,498 B1 10/2017 Harmke
9,813,806 B2 11/2017 Graham
9,818,426 B2 11/2017 Kotera
9,826,211 B2 11/2017 Sawa
9,854,101 B2 12/2017 Pandey
9,854,363 B2 12/2017 Sladeczek
9,860,439 B2 1/2018 Sawa
9,866,952 B2 1/2018 Pandey
D811,393 S 2/2018 Ahn
9,894,434 B2 2/2018 Rollow, IV
9,930,448 B1 3/2018 Chen
9,936,290 B2 4/2018 Mohammad
9,966,059 B1 5/2018 Ayrapetian
9,973,848 B2 5/2018 Chhetri
9,980,042 B1 5/2018 Benattar
D819,607 S 6/2018 Chui
D819,631 S 6/2018 Matsumiya
10,015,589 B1 7/2018 Ebenezer
10,021,506 B2 7/2018 Johnson
10,021,515 B1 7/2018 Mallya
10,034,116 B2 7/2018 Kadri
10,054,320 B2 8/2018 Choi
10,061,009 B1 8/2018 Family
10,062,379 B2 8/2018 Katuri
10,153,744 B1 12/2018 Every
10,165,386 B2 12/2018 Lehtiniemi
D841,589 S 2/2019 Böhmer
10,206,030 B2 2/2019 Matsumoto
10,210,882 B1 2/2019 Mccowan
10,231,062 B2 3/2019 Pedersen
10,244,121 B2 3/2019 Mani
10,244,219 B2 3/2019 Sawa
10,269,343 B2 4/2019 Wingate
10,366,702 B2 7/2019 Morton
10,367,948 B2 7/2019 Wells-Rutherford
D857,873 S 8/2019 Shimada
10,389,861 B2 8/2019 Mani
10,389,885 B2 8/2019 Sun
D860,319 S 9/2019 Beruto
D860,997 S 9/2019 Jhun
D864,136 S 10/2019 Kim
10,440,469 B2 10/2019 Barnett
D865,723 S 11/2019 Cho
10,566,008 B2 2/2020 Thorpe
10,602,267 B2 3/2020 Grosche
D883,952 S 5/2020 Lucas
10,650,797 B2 5/2020 Kumar
D888,020 S 6/2020 Lyu
10,728,653 B2 7/2020 Graham
D900,070 S 10/2020 Lantz
D900,071 S 10/2020 Lantz
D900,072 S 10/2020 Lantz
D900,073 S 10/2020 Lantz
D900,074 S 10/2020 Lantz
10,827,263 B2 11/2020 Christoph
10,863,270 B1 12/2020 O'Neill
10,930,297 B2 2/2021 Christoph
10,959,018 B1 3/2021 Shi
10,979,805 B2 4/2021 Chowdhary
D924,189 S 7/2021 Park
11,109,133 B2 8/2021 Lantz
D940,116 S 1/2022 Cho
2001/0031058 A1 10/2001 Anderson
2002/0015500 A1 2/2002 Belt

(56) References Cited

U.S. PATENT DOCUMENTS

| | | | |
|---|---|---|---|
| 2002/0041679 | A1 | 4/2002 | Beaucoup |
| 2002/0048377 | A1 | 4/2002 | Vaudrey |
| 2002/0064158 | A1 | 5/2002 | Yokoyama |
| 2002/0064287 | A1 | 5/2002 | Kawamura |
| 2002/0069054 | A1 | 6/2002 | Arrowood |
| 2002/0110255 | A1 | 8/2002 | Killion |
| 2002/0126861 | A1 | 9/2002 | Colby |
| 2002/0131580 | A1 | 9/2002 | Smith |
| 2002/0140633 | A1 | 10/2002 | Rafii |
| 2002/0146282 | A1 | 10/2002 | Wilkes |
| 2002/0149070 | A1 | 10/2002 | Sheplak |
| 2002/0159603 | A1 | 10/2002 | Hirai |
| 2003/0026437 | A1 | 2/2003 | Janse |
| 2003/0053639 | A1 | 3/2003 | Beaucoup |
| 2003/0059061 | A1 | 3/2003 | Tsuji |
| 2003/0063762 | A1 | 4/2003 | Tajima |
| 2003/0063768 | A1 | 4/2003 | Cornelius |
| 2003/0072461 | A1 | 4/2003 | Moorer |
| 2003/0107478 | A1 | 6/2003 | Hendricks |
| 2003/0118200 | A1 | 6/2003 | Beaucoup |
| 2003/0122777 | A1 | 7/2003 | Grover |
| 2003/0138119 | A1 | 7/2003 | Pocino |
| 2003/0156725 | A1 | 8/2003 | Boone |
| 2003/0161485 | A1 | 8/2003 | Smith |
| 2003/0163326 | A1 | 8/2003 | Maase |
| 2003/0169888 | A1 | 9/2003 | Subotic |
| 2003/0185404 | A1 | 10/2003 | Milsap |
| 2003/0198339 | A1 | 10/2003 | Roy |
| 2003/0198359 | A1 | 10/2003 | Killion |
| 2003/0202107 | A1 | 10/2003 | Slattery |
| 2004/0013038 | A1 | 1/2004 | Kajala |
| 2004/0013252 | A1 | 1/2004 | Craner |
| 2004/0076305 | A1 | 4/2004 | Santiago |
| 2004/0105557 | A1 | 6/2004 | Matsuo |
| 2004/0125942 | A1 | 7/2004 | Beaucoup |
| 2004/0175006 | A1 | 9/2004 | Kim |
| 2004/0202345 | A1 | 10/2004 | Stenberg |
| 2004/0240664 | A1 | 12/2004 | Freed |
| 2005/0005494 | A1 | 1/2005 | Way |
| 2005/0041530 | A1 | 2/2005 | Goudie |
| 2005/0069156 | A1 | 3/2005 | Haapapuro |
| 2005/0094580 | A1 | 5/2005 | Kumar |
| 2005/0094795 | A1 | 5/2005 | Rambo |
| 2005/0149320 | A1 | 7/2005 | Kajala |
| 2005/0157897 | A1 | 7/2005 | Saltykov |
| 2005/0175189 | A1 | 8/2005 | Lee |
| 2005/0175190 | A1 | 8/2005 | Tashev |
| 2005/0213747 | A1 | 9/2005 | Popovich |
| 2005/0221867 | A1 | 10/2005 | Zurek |
| 2005/0238196 | A1 | 10/2005 | Furuno |
| 2005/0270906 | A1 | 12/2005 | Ramenzoni |
| 2005/0271221 | A1 | 12/2005 | Cerwin |
| 2005/0286698 | A1 | 12/2005 | Bathurst |
| 2005/0286729 | A1 | 12/2005 | Harwood |
| 2006/0083390 | A1 | 4/2006 | Kaderavek |
| 2006/0088173 | A1 | 4/2006 | Rodman |
| 2006/0093128 | A1 | 5/2006 | Oxford |
| 2006/0098403 | A1 | 5/2006 | Smith |
| 2006/0104458 | A1 | 5/2006 | Kenoyer |
| 2006/0109983 | A1 | 5/2006 | Young |
| 2006/0151256 | A1 | 7/2006 | Lee |
| 2006/0159293 | A1 | 7/2006 | Azima |
| 2006/0161430 | A1 | 7/2006 | Schweng |
| 2006/0165242 | A1 | 7/2006 | Miki |
| 2006/0192976 | A1 | 8/2006 | Hall |
| 2006/0198541 | A1 | 9/2006 | Henry |
| 2006/0204022 | A1 | 9/2006 | Hooley |
| 2006/0215866 | A1 | 9/2006 | Francisco |
| 2006/0222187 | A1 | 10/2006 | Jarrett |
| 2006/0233353 | A1 | 10/2006 | Beaucoup |
| 2006/0239471 | A1 | 10/2006 | Mao |
| 2006/0262942 | A1 | 11/2006 | Oxford |
| 2006/0269080 | A1 | 11/2006 | Oxford |
| 2006/0269086 | A1 | 11/2006 | Page |
| 2007/0006474 | A1 | 1/2007 | Taniguchi |
| 2007/0009116 | A1 | 1/2007 | Reining |
| 2007/0019828 | A1 | 1/2007 | Hughes |
| 2007/0053524 | A1 | 3/2007 | Haulick |
| 2007/0093714 | A1 | 4/2007 | Beaucoup |
| 2007/0116255 | A1 | 5/2007 | Derkx |
| 2007/0120029 | A1 | 5/2007 | Keung |
| 2007/0165871 | A1 | 7/2007 | Roovers |
| 2007/0230712 | A1 | 10/2007 | Belt |
| 2007/0253561 | A1 | 11/2007 | Williams |
| 2007/0269066 | A1 | 11/2007 | Derleth |
| 2008/0008339 | A1 | 1/2008 | Ryan |
| 2008/0033723 | A1 | 2/2008 | Jang |
| 2008/0046235 | A1 | 2/2008 | Chen |
| 2008/0056517 | A1 | 3/2008 | Algazi |
| 2008/0101622 | A1 | 5/2008 | Sugiyama |
| 2008/0130907 | A1 | 6/2008 | Sudo |
| 2008/0144848 | A1 | 6/2008 | Buck |
| 2008/0168283 | A1 | 7/2008 | Penning |
| 2008/0188965 | A1 | 8/2008 | Bruey |
| 2008/0212805 | A1 | 9/2008 | Fincham |
| 2008/0232607 | A1 | 9/2008 | Tashev |
| 2008/0247567 | A1 | 10/2008 | Kjolerbakken |
| 2008/0253553 | A1 | 10/2008 | Li |
| 2008/0253589 | A1 | 10/2008 | Trahms |
| 2008/0259731 | A1 | 10/2008 | Happonen |
| 2008/0260175 | A1 | 10/2008 | Elko |
| 2008/0279400 | A1 | 11/2008 | Knoll |
| 2008/0285772 | A1 | 11/2008 | Haulick |
| 2009/0003586 | A1 | 1/2009 | Lai |
| 2009/0030536 | A1 | 1/2009 | Gur |
| 2009/0052684 | A1 | 2/2009 | Ishibashi |
| 2009/0086998 | A1 | 4/2009 | Jeong |
| 2009/0087000 | A1 | 4/2009 | Ko |
| 2009/0087001 | A1 | 4/2009 | Jiang |
| 2009/0094817 | A1 | 4/2009 | Killion |
| 2009/0129609 | A1 | 5/2009 | Oh |
| 2009/0147967 | A1 | 6/2009 | Ishibashi |
| 2009/0150149 | A1 | 6/2009 | Cutter |
| 2009/0161880 | A1 | 6/2009 | Hooley |
| 2009/0169027 | A1 | 7/2009 | Ura |
| 2009/0173030 | A1 | 7/2009 | Gulbrandsen |
| 2009/0173570 | A1 | 7/2009 | Levit |
| 2009/0226004 | A1 | 9/2009 | Moeller |
| 2009/0233545 | A1 | 9/2009 | Sutskover |
| 2009/0237561 | A1 | 9/2009 | Kobayashi |
| 2009/0254340 | A1 | 10/2009 | Sun |
| 2009/0274318 | A1 | 11/2009 | Ishibashi |
| 2009/0310794 | A1 | 12/2009 | Ishibashi |
| 2010/0011644 | A1 | 1/2010 | Kramer |
| 2010/0034397 | A1 | 2/2010 | Nakadai |
| 2010/0074433 | A1 | 3/2010 | Zhang |
| 2010/0111323 | A1 | 5/2010 | Marton |
| 2010/0111324 | A1 | 5/2010 | Yeldener |
| 2010/0119097 | A1 | 5/2010 | Ohtsuka |
| 2010/0123785 | A1 | 5/2010 | Chen |
| 2010/0128892 | A1 | 5/2010 | Chen |
| 2010/0128901 | A1 | 5/2010 | Herman |
| 2010/0131749 | A1 | 5/2010 | Kim |
| 2010/0142721 | A1 | 6/2010 | Wada |
| 2010/0150364 | A1 | 6/2010 | Buck |
| 2010/0158268 | A1 | 6/2010 | Marton |
| 2010/0165071 | A1 | 7/2010 | Ishibashi |
| 2010/0166219 | A1 | 7/2010 | Marton |
| 2010/0189275 | A1 | 7/2010 | Christoph |
| 2010/0189299 | A1 | 7/2010 | Grant |
| 2010/0202628 | A1 | 8/2010 | Meyer |
| 2010/0208605 | A1 | 8/2010 | Wang |
| 2010/0215184 | A1 | 8/2010 | Buck |
| 2010/0215189 | A1 | 8/2010 | Marton |
| 2010/0217590 | A1 | 8/2010 | Nemer |
| 2010/0245624 | A1 | 9/2010 | Beaucoup |
| 2010/0246873 | A1 | 9/2010 | Chen |
| 2010/0284185 | A1 | 11/2010 | Ngai |
| 2010/0305728 | A1 | 12/2010 | Aiso |
| 2010/0314513 | A1 | 12/2010 | Evans |
| 2011/0002469 | A1 | 1/2011 | Ojala |
| 2011/0007921 | A1 | 1/2011 | Stewart |
| 2011/0033063 | A1 | 2/2011 | Mcgrath |
| 2011/0038229 | A1 | 2/2011 | Beaucoup |

(56) References Cited

U.S. PATENT DOCUMENTS

2011/0096136 A1 4/2011 Liu
2011/0096631 A1 4/2011 Kondo
2011/0096915 A1 4/2011 Nemer
2011/0164761 A1 7/2011 Mccowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0076316 A1 3/2012 Zhu
2012/0080260 A1 4/2012 Stewart
2012/0093344 A1 4/2012 Sun
2012/0117474 A1 5/2012 Miki
2012/0128160 A1 5/2012 Kim
2012/0128175 A1 5/2012 Visser
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0243698 A1 9/2012 Elko
2012/0262536 A1 10/2012 Chen
2012/0288079 A1 11/2012 Burnett
2012/0288114 A1 11/2012 Duraiswami
2012/0294472 A1 11/2012 Hudson
2012/0327115 A1 * 12/2012 Chhetri .................. H04R 3/005
345/633
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101141 A1 4/2013 Mcelveen
2013/0136274 A1 5/2013 Aehgren
2013/0142343 A1 6/2013 Matsui
2013/0147835 A1 6/2013 Lee
2013/0156198 A1 6/2013 Kim
2013/0182190 A1 7/2013 Mccartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Mark
2014/0050332 A1 2/2014 Nielsen
2014/0072151 A1 3/2014 Ochs
2014/0098233 A1 4/2014 Martin
2014/0098964 A1 4/2014 Rosca
2014/0122060 A1 5/2014 Kaszczuk
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 * 11/2014 Lambert .............. H04R 1/2876
381/92
2014/0357177 A1 12/2014 Stewart
2014/0363008 A1 12/2014 Chen
2015/0003638 A1 1/2015 Kasai
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 * 3/2015 Etter ...................... H04R 3/005
381/92
2015/0078582 A1 3/2015 Graham
2015/0097719 A1 4/2015 Balachandreswaran
2015/0104023 A1 4/2015 Bilobrov
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins
2015/0189423 A1 7/2015 Giannuzzi
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Virolainen
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Ojanperä
2016/0165340 A1 6/2016 Benattar
2016/0173976 A1 6/2016 Podhradsky
2016/0173978 A1 6/2016 Li
2016/0189727 A1 6/2016 Wu
2016/0192068 A1 6/2016 Ng
2016/0196836 A1 7/2016 Yu
2016/0234593 A1 8/2016 Matsumoto
2016/0249132 A1 8/2016 Oliaei
2016/0275961 A1 9/2016 Yu
2016/0295279 A1 10/2016 Srinivasan
2016/0300584 A1 10/2016 Pandey

(56) References Cited

U.S. PATENT DOCUMENTS

| | | | | |
|---|---|---|---|---|
| 2016/0302002 | A1 | 10/2016 | Lambert | |
| 2016/0302006 | A1 | 10/2016 | Pandey | |
| 2016/0323667 | A1 | 11/2016 | Shumard | |
| 2016/0323668 | A1* | 11/2016 | Abraham | H04R 1/406 |
| 2016/0330545 | A1 | 11/2016 | Mcelveen | |
| 2016/0337523 | A1 | 11/2016 | Pandey | |
| 2016/0353200 | A1 | 12/2016 | Bigeh | |
| 2016/0357508 | A1 | 12/2016 | Moore | |
| 2017/0019744 | A1 | 1/2017 | Matsumoto | |
| 2017/0064451 | A1 | 3/2017 | Park | |
| 2017/0105066 | A1 | 4/2017 | Mclaughlin | |
| 2017/0134849 | A1 | 5/2017 | Pandey | |
| 2017/0134850 | A1 | 5/2017 | Graham | |
| 2017/0164101 | A1 | 6/2017 | Rollow, IV | |
| 2017/0180861 | A1 | 6/2017 | Chen | |
| 2017/0206064 | A1 | 7/2017 | Breazeal | |
| 2017/0230748 | A1 | 8/2017 | Shumard | |
| 2017/0264999 | A1 | 9/2017 | Fukuda | |
| 2017/0303887 | A1 | 10/2017 | Richmond | |
| 2017/0308352 | A1 | 10/2017 | Kessler | |
| 2017/0374454 | A1 | 12/2017 | Bernardini | |
| 2018/0083848 | A1 | 3/2018 | Siddiqi | |
| 2018/0102136 | A1 | 4/2018 | Ebenezer | |
| 2018/0109873 | A1 | 4/2018 | Xiang | |
| 2018/0115799 | A1 | 4/2018 | Thiele | |
| 2018/0160224 | A1 | 6/2018 | Graham | |
| 2018/0196585 | A1 | 7/2018 | Densham | |
| 2018/0219922 | A1 | 8/2018 | Bryans | |
| 2018/0227666 | A1 | 8/2018 | Barnett | |
| 2018/0292079 | A1 | 10/2018 | Branham | |
| 2018/0310096 | A1 | 10/2018 | Shumard | |
| 2018/0313558 | A1 | 11/2018 | Byers | |
| 2018/0338205 | A1 | 11/2018 | Abraham | |
| 2018/0359565 | A1 | 12/2018 | Kim | |
| 2019/0042187 | A1 | 2/2019 | Truong | |
| 2019/0166424 | A1 | 5/2019 | Harney | |
| 2019/0215540 | A1 | 7/2019 | Nicol | |
| 2019/0230436 | A1 | 7/2019 | Tsingos | |
| 2019/0259408 | A1 | 8/2019 | Freeman | |
| 2019/0268683 | A1 | 8/2019 | Miyahara | |
| 2019/0295540 | A1 | 9/2019 | Grima | |
| 2019/0295569 | A1 | 9/2019 | Wang | |
| 2019/0319677 | A1 | 10/2019 | Hansen | |
| 2019/0371354 | A1 | 12/2019 | Lester | |
| 2019/0373362 | A1 | 12/2019 | Ansai | |
| 2019/0385629 | A1 | 12/2019 | Moravy | |
| 2019/0387311 | A1 | 12/2019 | Schultz | |
| 2020/0015021 | A1 | 1/2020 | Leppanen | |
| 2020/0021910 | A1 | 1/2020 | Rollow, IV | |
| 2020/0037068 | A1 | 1/2020 | Barnett | |
| 2020/0068297 | A1 | 2/2020 | Rollow, IV | |
| 2020/0100009 | A1 | 3/2020 | Lantz | |
| 2020/0100025 | A1 | 3/2020 | Shumard | |
| 2020/0137485 | A1 | 4/2020 | Yamakawa | |
| 2020/0145753 | A1 | 5/2020 | Rollow, IV | |
| 2020/0152218 | A1 | 5/2020 | Kikuhara | |
| 2020/0162618 | A1 | 5/2020 | Enteshari | |
| 2020/0228663 | A1 | 7/2020 | Wells-Rutherford | |
| 2020/0228896 | A1* | 7/2020 | Chesney | G10L 15/22 |
| 2020/0251119 | A1 | 8/2020 | Yang | |
| 2020/0275204 | A1 | 8/2020 | Labosco | |
| 2020/0278043 | A1 | 9/2020 | Cao | |
| 2020/0288237 | A1 | 9/2020 | Abraham | |
| 2021/0012789 | A1 | 1/2021 | Husain | |
| 2021/0021940 | A1 | 1/2021 | Petersen | |
| 2021/0044881 | A1 | 2/2021 | Lantz | |
| 2021/0051397 | A1 | 2/2021 | Veselinovic | |
| 2021/0098014 | A1 | 4/2021 | Tanaka | |
| 2021/0098015 | A1 | 4/2021 | Pandey | |
| 2021/0120335 | A1 | 4/2021 | Veselinovic | |
| 2021/0200504 | A1 | 7/2021 | Park | |
| 2021/0263126 | A1* | 8/2021 | Arai | H04R 1/406 |
| 2021/0375298 | A1 | 12/2021 | Zhang | |

FOREIGN PATENT DOCUMENTS

| | | |
|---|---|---|
| CA | 2505496 | 10/2006 |
| CA | 2838856 | 12/2012 |
| CA | 2846323 | 9/2014 |
| CN | 1780495 | 5/2006 |
| CN | 101217830 | 7/2008 |
| CN | 101828407 | 9/2010 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 | 10/2014 |
| CN | 104347076 | 2/2015 |
| CN | 104581463 | 4/2015 |
| CN | 105355210 | 2/2016 |
| CN | 105548998 | 5/2016 |
| CN | 106162427 | 11/2016 |
| CN | 106251857 | 12/2016 |
| CN | 106782584 | 5/2017 |
| CN | 106851036 | 6/2017 |
| CN | 206349145 | 7/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2942975 | 11/2015 |
| EP | 2988527 | 2/2016 |
| EP | 3131311 | 2/2017 |
| GB | 2393601 | 3/2004 |
| GB | 2446620 | 8/2008 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |

(56) References Cited

FOREIGN PATENT DOCUMENTS

| | | |
|---|---|---|
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. On Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. On Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al, "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound,1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.

(56) References Cited

OTHER PUBLICATIONS

Audix Microphones, Audix Introduces Innovative Ceiling Mics, http://audixusa.com/docs_12/latest_news/EFpIFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Avnetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et Al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
Bno055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics—Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAIaIQobChMI2JTw-Ynm6AIVgbbICh3F4QKuEAkYBiABEgJZMPD_BwE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
ClearOne, Beamforming Microphone Array, Mar. 2012, 6 pgs.
ClearOne, Ceiling Microphone Array Installation Manual, Jan. 9, 2012, 20 pgs.
ClearOne, Converge/Converge Pro, Manual, 2008, 51 pp.

(56) References Cited

OTHER PUBLICATIONS

ClearOne, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Altemative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS-400/800 Beamforming Mixers, Nov. 2008, 26 pp.
CTG Audio, Expand Your IP Teleconferencing to Full Room Audio, Obtained from website htt. )://www ct audio com/ex and-, our-i -teleconforencino-to-ful-room-audio-while-conquennc.1-echo-cancelation-issues Mull, 2014.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. On Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST—Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.

(56) References Cited

OTHER PUBLICATIONS

Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016.
International Search Report and Written Opinion for PCT/US2016/029751 dated Nov. 28, 2016, 21 pp.
International Search Report and Written Opinion for PCT/US2018/013155 dated Jun. 8, 2018.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.

(56) References Cited

OTHER PUBLICATIONS

Marquardt et al., A Natural Acoustic Front-End for Interactive TV in the EU-Project Dicit, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), Inria Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. On Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
SerDes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.

(56) References Cited

OTHER PUBLICATIONS

Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 1, No. 2, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pgs. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent US Court Ruling on Shure MXA910, Available at <https://www.shure.com/en-US/meta/legal/q-and-a-inresponse-to-recent-us-court-ruling-on-shure-mxa910-response>, As early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, As early as 2020, 12 pp.
Signal Processor MRX7-D Product Specifications, Yamaha Corporation, 2016.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010.
Symetrix, Inc., SymNet Network Audio Solutions Brochure, 2008, 32 pgs.
SymNet Network Audio Solutions Brochure, Symetrix, Inc., 2008.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, Sensors, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE Assp Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "Loud: A 1020-Node Microphone Array and Acoustic Beamformer," 14th International Congress on Sound & Vibration, Jul. 2007, 8 pgs.
Weinstein, et al., "Loud: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.

* cited by examiner

All Mics @ Unity, 3600Hz

Center Line, Inner and Middle Band @ Unity, Outer Band @ 50%, 3600Hz

Center Line Mics and Inner Band @ Unity, Middle Band @ 75%, Outer Band @ 25%, 3600Hz Center Line Mics and Inner Band @ Unity, Middle Band @ 50%, 3600Hz

ADJUSTABLE LOBE SHAPE FOR ARRAY MICROPHONES

CROSS-REFERENCE

This application is a continuation of U.S. patent application Ser. No. 16/576,549, filed on Sep. 19, 2019, which claims priority to U.S. Provisional Patent Application No. 62/733,779, filed on Sep. 20, 2018, both of which are incorporated by reference herein in their entireties.

TECHNICAL FIELD

This application generally relates to an array microphone having adjustable lobe shapes. In particular, this application relates to an array microphone that allows more control over the shape of lobes in a direction independent of a steering vector of the lobe.

BACKGROUND

Conferencing environments, such as conference rooms, boardrooms, video conferencing applications, and the like, can involve the use of microphones for capturing sound from various audio sources active in such environments. Such audio sources may include humans speaking, for example. The captured sound may be disseminated to a local audience in the environment through amplified speakers (for sound reinforcement), and/or to others remote from the environment (such as via a telecast and/or a webcast). The types of microphones and their placement in a particular environment may depend on the locations of the audio sources, physical space requirements, aesthetics, room layout, and/or other considerations. For example, in some environments, the microphones may be placed on a table or lectern near the audio sources. In other environments, the microphones may be mounted overhead to capture the sound from the entire room, for example. Accordingly, microphones are available in a variety of sizes, form factors, mounting options, and wiring options to suit the needs of particular environments.

Traditional microphones typically have fixed polar patterns and few manually selectable settings. To capture sound in a conferencing environment, many traditional microphones can be used at once to capture the audio sources within the environment. However, traditional microphones tend to capture unwanted audio as well, such as room noise, echoes, and other undesirable audio elements. The capturing of these unwanted noises is exacerbated by the use of many microphones.

Array microphones having multiple microphone elements can provide benefits such as steerable coverage or pick up patterns (having one or more lobes), which allow the microphones to focus on the desired audio sources and reject unwanted sounds such as room noise. The ability to steer audio pick up patterns provides the benefit of being able to be less precise in microphone placement, and in this way, array microphones are more forgiving. Moreover, array microphones provide the ability to pick up multiple audio sources with one array microphone or unit, again due to the ability to steer the pickup patterns.

However, the geometry of lobes of a pickup pattern of an array microphone may not be optimal in certain environments and situations. For example, the dimensions or layout of a room may be such that it cannot be efficiently covered by the lobes, or a default lobe shape may pick up undesirable noise when steered at a desired audio source. Similarly, the default lobe shapes may not cover all desired audio sources if such sources are too dispersed throughout a room. As an example, undesirable or unwanted audio sources may be picked up by the lobes. In another example, two adjacent talkers may be more efficiently picked up by one stretched lobe rather than two default narrow lobes.

Accordingly, there is an opportunity for an array microphone that addresses these concerns. More particularly, there is an opportunity for an array microphone that allows more control of the overall shape of lobes for more efficient and optimal coverage of environments.

SUMMARY

The invention is intended to solve the above-noted problems by providing array microphone systems and methods that are designed to, among other things: (1) enable adjustment of the shape of lobes of an array microphone in a direction independent of a steering vector of a lobe; (2) select subsets of microphone elements of an array microphone to perform the lobe shape adjustment; and (3) determine weights for adjusting the lobe shape of an array microphone.

In one embodiment, an array microphone includes a processor and a plurality of microphone elements each configured to detect sound and output an audio signal. The processor may be in communication with the plurality of microphone elements. The processor may be configured to receive the audio signal from each of the plurality of microphone elements, form one or more lobes based on combining the audio signals, and apply a weight to a magnitude of the audio signal of one or more subsets of the plurality of microphone elements such that a shape of the one or more lobes is adjusted.

In another embodiment, a method is disclosed for selecting one or more subsets of a plurality of microphone elements in an array microphone for adjusting a shape of a lobe of the array microphone using a processor. The method may include receiving a desired steering vector and a desired shape of the lobe of the array microphone at the processor; designating a centerline of the plurality of microphone elements that is transverse to the desired steering vector, based on the desired steering vector, using the processor; selecting the one or more subsets of the plurality of microphone elements based on the respective distances of the subsets to the centerline, using the processor; and determining a weight for the selected subsets of the plurality of microphone elements, using the processor, wherein the weight can be applied to a magnitude of the audio signal of the selected subsets such that a shape of the one or more lobes is adjusted to the desired shape.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
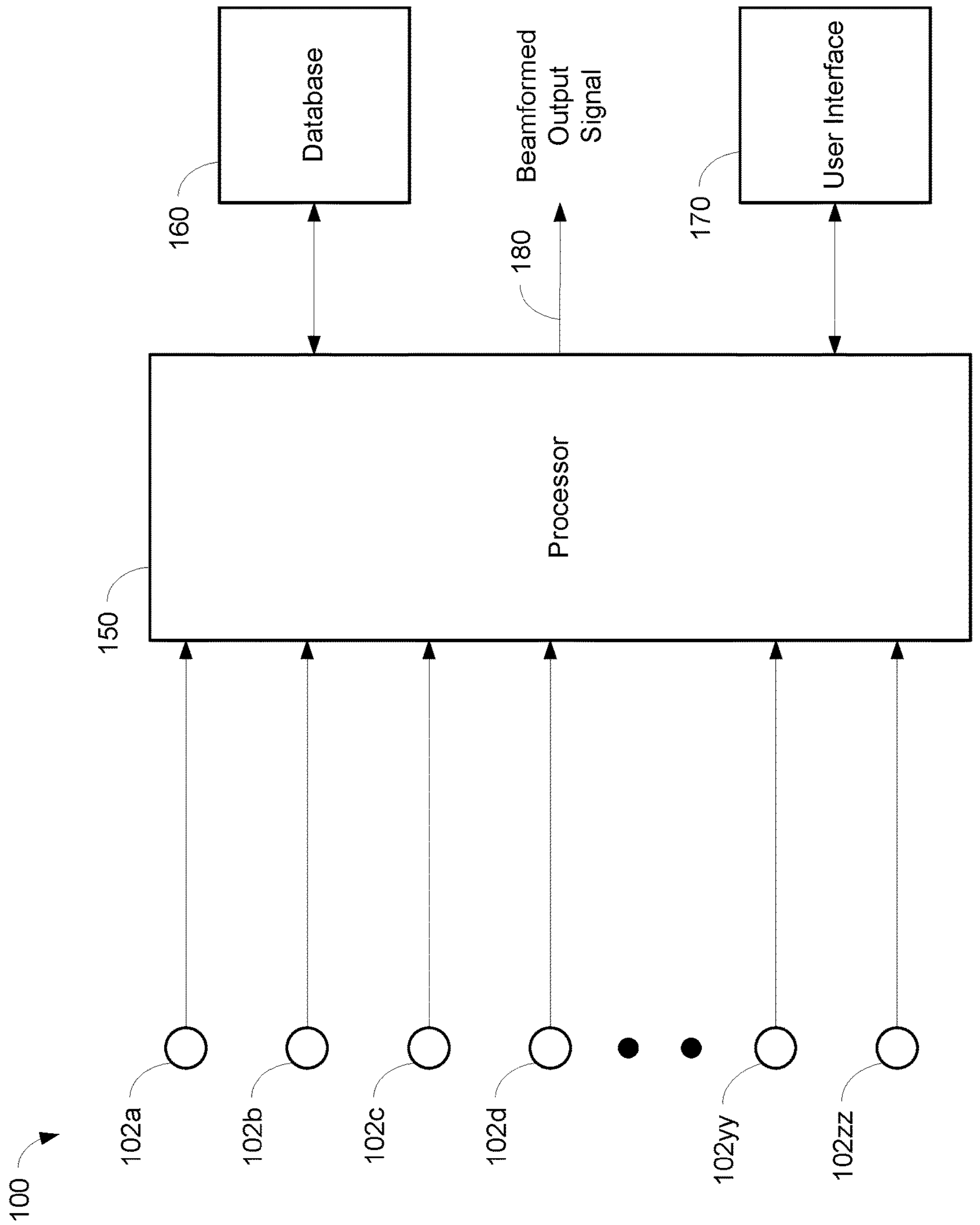
FIG. 1 is a block diagram of an array microphone, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The array microphone systems and methods described herein can enable adjustment of the shape of lobes of pickup patterns to provide more efficient and optimal coverage of environments for sound capture. The array microphone may include a plurality of microphone elements, and a processor in communication with the microphone elements. The processor may form one or more lobes by combining audio signals received from the microphone elements, and each lobe may be associated with a steering vector. The processor may adjust the shape of the lobes in a direction independent of the steering vector by applying weights to the magnitudes of the audio signals of subsets of the microphone elements. In this way, users can have greater control over the geometry of lobes of array microphones to, for example, avoid undesired noise and/or to more efficiently cover audio sources within an environment.

FIG. 1 is a block diagram of an array microphone 100 that can detect sounds from an audio source at various frequencies. The array microphone 100 may be utilized in a conference room or boardroom, for example, where the audio source may be one or more human speakers. Other sounds may be present in the environment which may be undesirable, such as noise from ventilation, other persons, audio/visual equipment, electronic devices, etc. In a typical situation, the audio sources may be seated in chairs at a table, although other configurations and placements of the audio sources are contemplated and possible.

The array microphone 100 may be placed on a table, lectern, desktop, etc. so that the sound from the audio sources can be detected and captured, such as speech spoken by human speakers. The array microphone 100 may include any number of microphone elements 102*a,b, . . . ,zz*, for example, and be able to form multiple pickup patterns so that the sound from the audio sources can be detected and captured. Any appropriate number of microphone elements 102 are possible and contemplated.

Each of the microphone elements 102 in the array microphone 100 may detect sound and convert the sound to an analog audio signal. Components in the array microphone 100, such as analog to digital converters, processors, and/or other components, may process the analog audio signals and ultimately generate one or more digital audio output signals. The digital audio output signals may conform to the Dante standard for transmitting audio over Ethernet, in some embodiments, or may conform to another standard and/or transmission protocol. In embodiments, each of the microphone elements 102 in the array microphone 11 may detect sound and convert the sound to a digital audio signal. One or more pickup patterns may be formed by a processor 150 in the array microphone 100 from the audio signals of the microphone elements 102, and the processor 150 may generate a digital audio output signal 180 corresponding to each of the pickup patterns. The pickup patterns may be composed of one or more lobes, e.g., main, side, and back lobes. In other embodiments, the microphone elements 102 in the array microphone 100 may output analog audio signals so that other components and devices (e.g., processors, mixers, recorders, amplifiers, etc.) external to the array microphone 100 may process the analog audio signals.

The array microphone 100 may include the microphone elements 102; the processor 150 in wired or wireless communication with the microphone elements 102; a database 160 in wired or wireless communication with the processor 150; and a user interface 170 in wired or wireless communication with the processor 150. These components are described in more detail below. The various components included in the array microphone 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.

Figure 2:
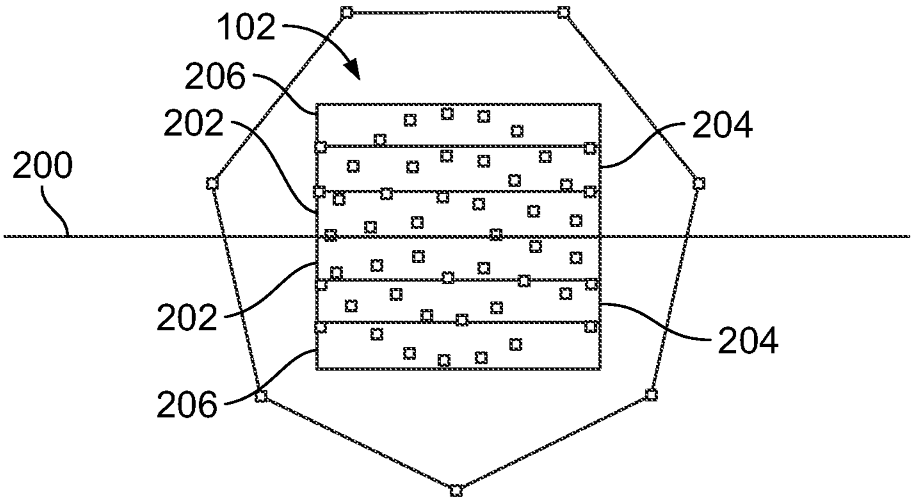
FIG. 2 is a schematic diagram of an array microphone including microphone elements, in accordance with some embodiments.

As depicted in the schematic diagram of FIG. 2, the microphone elements 102 (denoted by dots) may be arranged in concentric rings and/or be harmonically nested. The microphone elements 102 may be arranged to be generally symmetric, in some embodiments. In other embodiments, the microphone elements 102 may be arranged asymmetrically or in another arrangement. In further embodiments, the microphone elements 102 may be arranged on a substrate, placed in a frame, or individually suspended, for example. An embodiment of an array microphone 100 is described in commonly assigned U.S. Pat. No. 9,565,493, which is hereby incorporated by reference in its entirety herein. In embodiments, the microphone elements 102 may be unidirectional microphones that are primarily sensitive in one direction. In other embodiments, the microphone elements 102 may have other directionalities or polar patterns, such as cardioid, subcardioid, or omnidirectional, as desired. The microphone elements 102 may be any suitable type of transducer that can detect the sound from an audio source and convert the sound to an electrical audio signal. In an embodiment, the microphone elements 102 may be micro-electrical mechanical system (MEMS) microphones. In other embodiments, the microphone elements 102 may be condenser microphones, balanced armature microphones, electret microphones, dynamic microphones, and/or other types of microphones.

The microphone elements 102 depicted in FIG. 2 may be positioned and configured to cover a specific frequency band within a range of operating frequencies. For example, there may be a plurality of microphone elements 102, as shown in FIG. 2, that are positioned and configured to cover upper frequencies. Other microphone elements (not shown) may be positioned and configured to cover other specific frequency bands. As described in more detail below, the microphone elements 102 may be selectively separated into segments for purposes of lobe shape adjustment, in embodiments. In other embodiments, the microphone elements 102 may be selected on a per microphone element basis for purposes of lobe shape adjustment.

Figure 3:
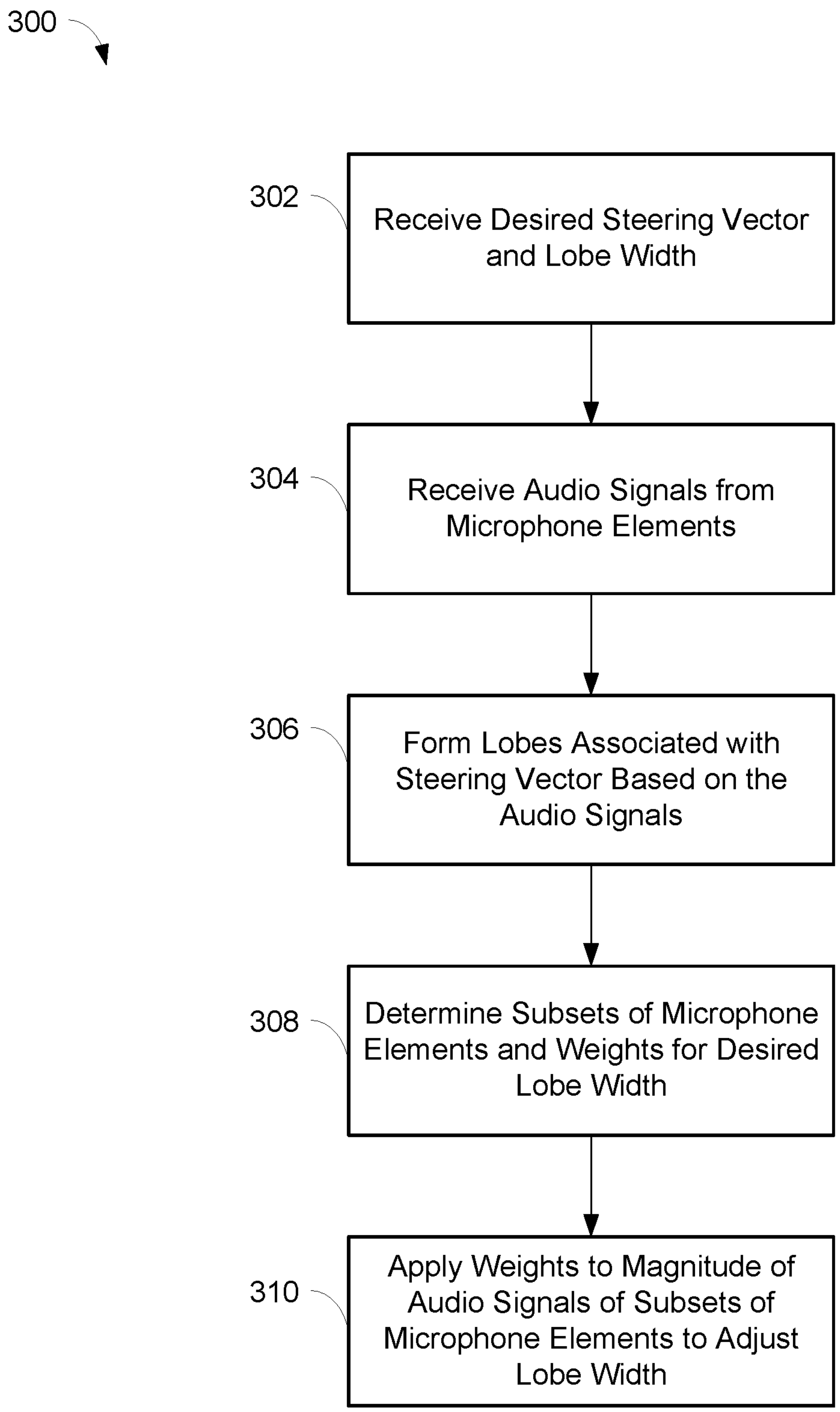
FIG. 3 is a flowchart illustrating operations for adjusting lobe shapes of an array microphone, in accordance with some embodiments.

An embodiment of a process 300 for adjusting lobe shapes of the array microphone 100 is shown in FIG. 3. The process 300 may be utilized to output a beamformed output signal 180 from the array microphone 100 shown in FIG. 1 that corresponds to a pickup pattern having an adjusted lobe shape. One or more processors 150 and/or other processing components (e.g., analog to digital converters, encryption chips, etc.) within or external to the microphone may perform any, some, or all of the steps of the process 300. One or more other types of components (e.g., memory, input and/or output devices, transmitters, receivers, buffers, drivers, discrete components, etc.) may also be utilized in conjunction with the processors 150 and/or other processing components to perform any, some, or all of the steps of the process 300.

At step 302, a desired steering vector and desired shape for a lobe may be received at the processor 150. In embodiments, the desired steering vector and desired shape for a lobe may be determined programmatically or algorithmically using automated decision making schemes. In other embodiments, a user may enter the desired steering vector and desired shape at a user interface 170 in communication with the processor 150. The user interface 170 may be a dedicated electronic device (e.g., touchscreen, keypad, etc.) or a standalone electronic device (e.g., smartphone, tablet, computer, etc.), in embodiments. In embodiments, the user interface 170 may display a depiction of the lobe to assist a user in configuring the array microphone 100, such as by showing a lobe emanating from the array microphone 100 at a present steering vector and/or desired steering vector with a present lobe shape and/or desired lobe shape.

The desired steering vector may be determined or entered as a particular three dimensional coordinate relative to the location of the array microphone 100, such as in Cartesian coordinates (i.e., x, y, z), or in spherical coordinates (i.e., radial distance r, polar angle θ (theta), azimuthal angle φ (phi)), for example. The desired lobe shape may be entered or determined in gradations (e.g., narrow, medium, wide, etc.), or as an angle of the field of view (e.g., degrees, change in degrees, percentage change, etc.) in one or more dimensions, for example.

The processor 150 may receive audio signals from the microphone elements 102 at step 304. The microphone elements 102 may be arranged as depicted in FIG. 2, for example, or in another other suitable arrangement. At step 306, one or more lobes of a pickup pattern may be formed by the processor 150 by combining the audio signals received from the microphone elements 102. The lobes may be formed using any suitable beamforming algorithm. The lobes may be formed to correspond to the desired steering vector received at step 302, for example.

The adjustment of the lobe shape may be performed at steps 308 and 310. In particular, at step 308, the processor 150 may determine (1) a subset of microphone elements 102 and (2) weights to be applied to the audio signals from the microphone elements 102, both of which will be used to implement the desired lobe shape adjustment. In some embodiments, the processor 150 may determine the subset of microphone elements 102 and the weights in real-time for a particular lobe shape adjustment, such as by calculating the weights using closed form solutions. One embodiment of a method for the selection of subsets of microphone elements 102 and weights is discussed below with respect to the process 400 shown in FIG. 4. In other embodiments, for a particular lobe shape adjustment, the processor 150 may retrieve from the database 160 a list denoting the subset of microphone elements 102 and the weights to be applied to the audio signals from the microphone elements 102. In this embodiment, the database 160 may include multiple lists and weights for various lobe shape adjustments. The database 160 may have been pre-loaded with such lists and weights in a lookup table, for example. In further embodiment, the selection of subsets of microphone elements 102 and weights may be based on real-time adaptive beamforming.

In some embodiments, a subset of the microphone elements 102 may be selected on a per microphone element basis. In other embodiments, a subset of the microphone elements 102 may be selected by segmenting them, such as shown in FIG. 2. For example, the microphone elements 102 in the embodiment shown in FIG. 2 can be classified based on a centerline 200 and segments 202, 204, and 206 that are mirrored about the centerline 200. The number and types of segments may vary in other embodiments of arrays of microphone elements 102. As shown in FIG. 2, a first subset of microphone elements 102 may be the microphone elements 102 that are generally arranged along the centerline 200. A second subset of microphone elements 102 may be the microphone elements 102 that are generally within the inner mirrored segments 202 that are adjacent to the centerline 200. A third subset of microphone elements 102 may be the microphone elements 102 that are generally within the middle mirrored segments 204 that are adjacent to the inner mirrored segments 202. A fourth subset of microphone elements 102 may be the microphone elements 102 that are generally within the outer mirrored segments 206 that are adjacent to the middle mirrored segments 204. None, some, or all of the microphone elements 102 in the segments 202, 204, and 206 may be selected for a particular lobe shape adjustment.

The weights may be applied to the magnitude of the audio signals of the subset of microphone elements 102 at step 310, in order to adjust the shape of the lobe to the desired lobe shape. The adjustment of the lobe shape may be in a direction independent of the steering vector. For example, the lobe may be stretched to be wider while the steering vector of the lobe is maintained. In some embodiments, the weights that are applied may be based on a distance of the microphone elements 102 in a selected subset from the centerline 200. In these embodiments, the centerline 200 may be transverse to the steering vector of the lobe. The weighting may be defined as a fractional magnitude scaling that is algorithmically determined based on the vector definition of the direction the lobe is being stretched in, for example. This determination may be Gaussian, linear, or based on any number of functionally derived weighting factors. The beamformed output signal 180 from the microphone array 100 may correspond to a pickup pattern having a lobe with the adjusted shape that has been achieved as a result of the process 300.

FIGS. 5A-5F show polar response graphs for various combinations of subsets of microphone elements 102 and weights that may result from various lobe shape adjustments. In FIGS. 5A-5F, the polar response graphs represent a slice of the polar response that assumes axial symmetry around the 0° axis. In particular, the plane of the microphone array 100 is the plane through 90° and 270°, and 0° is the direction of the array steering. As noted in the legend of the figures, the two lines in each graph show fixed and variable lobe shapes. The fixed axis lines show the behavior of the microphone array 100 when all of microphone elements 102 are being used at full magnitude. In contrast, the variable axis lines show the behavior of the microphone array 100 at the same steering angle with the magnitude weighting applied as denoted.

Figure 5A:
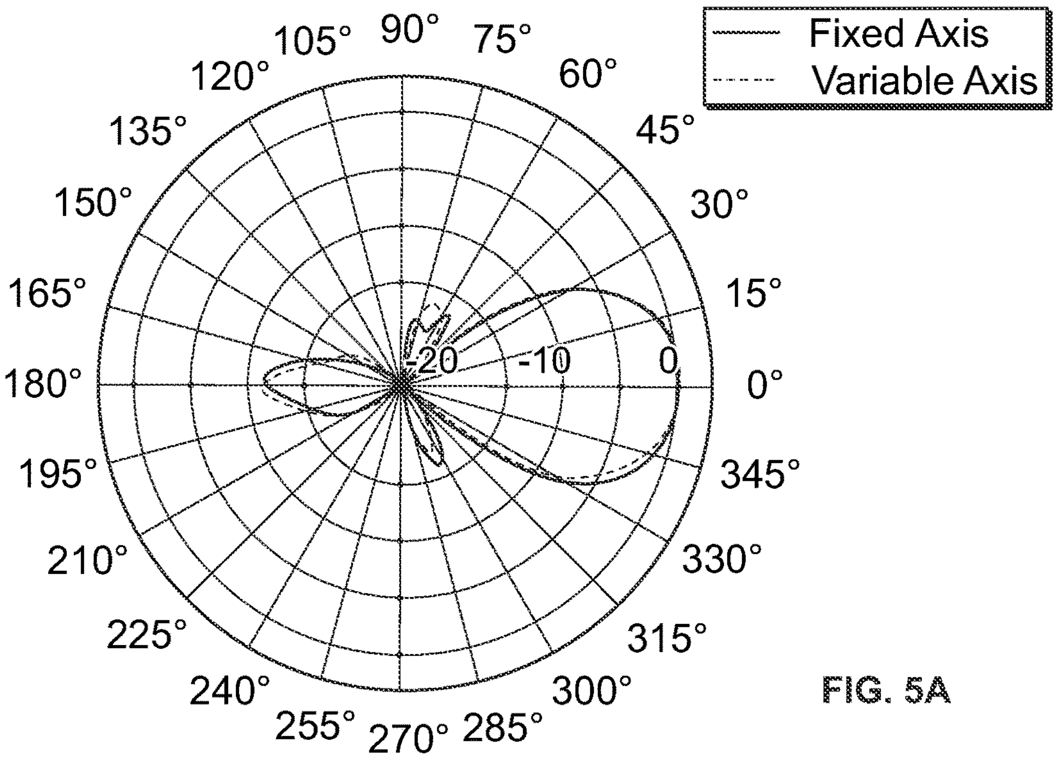
FIGS. 5A-5F are graphs showing polar responses for various subsets of microphone elements and magnitude weightings, in accordance with some embodiments.
Figure 5B:
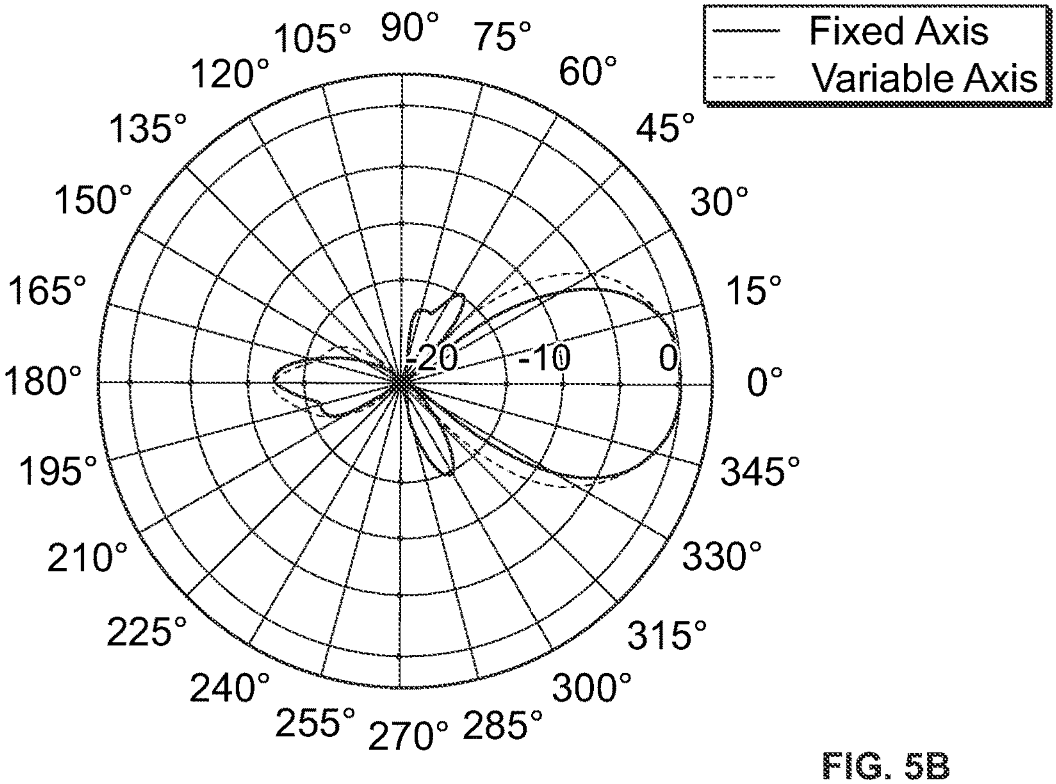

FIG. 5A shows a lobe and its shape when no weighting is applied to any of the microphone elements 102. The depiction in FIG. 5A can be considered as a baseline lobe that has not yet had any lobe shape adjustments. FIG. 5B shows a lobe with a wider shape than the lobe in FIG. 5A, when the subset of microphone elements 102 in the outer segments 206 have been selected to have a weight of 50% applied to the magnitude of the audio signals of the subset. In this scenario, no weighting is applied to the microphone elements 102 in the centerline 200, inner segments 202, and middle segments 204.

Figure 5C:
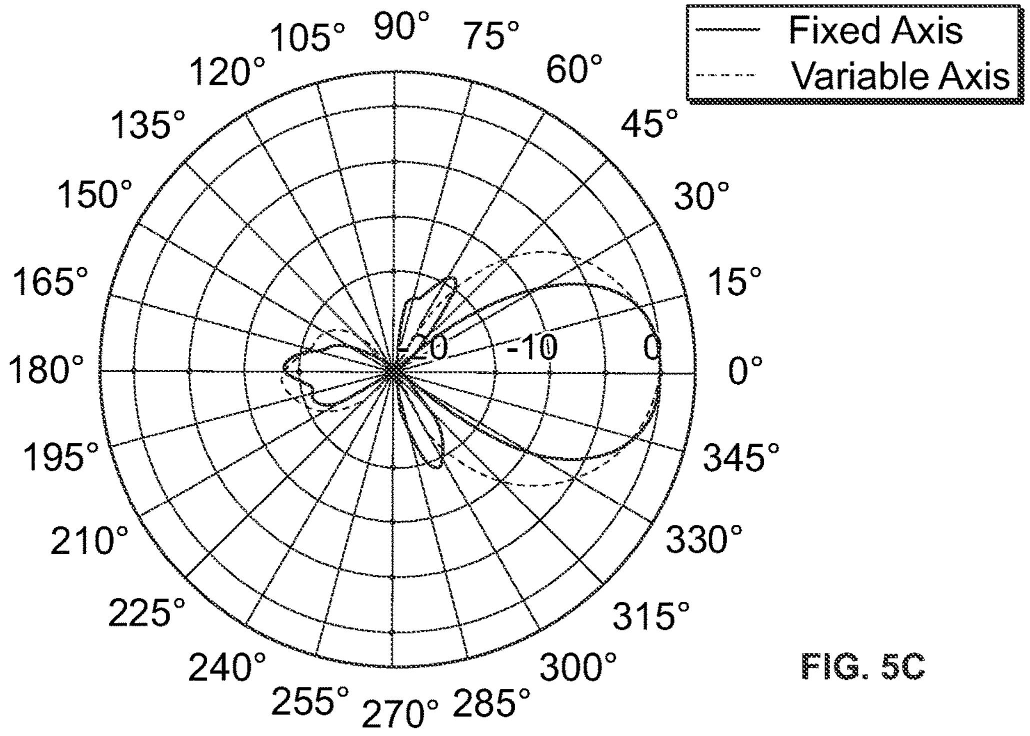
Figure 5D:
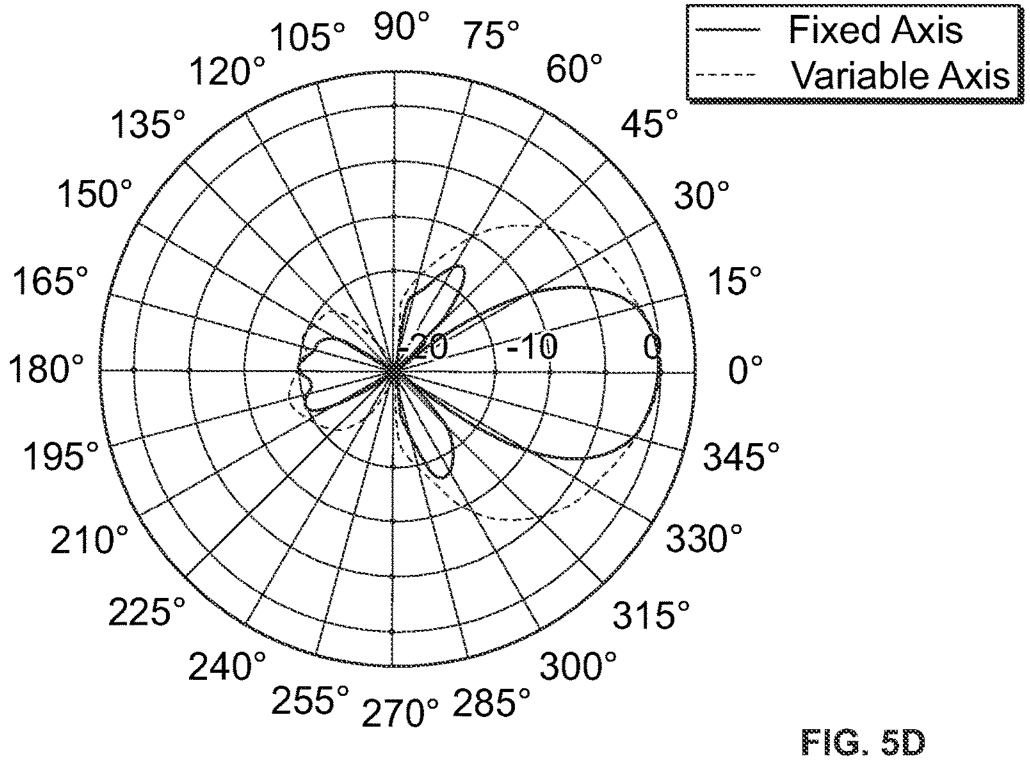

FIG. 5C shows a lobe with a wider shape than the lobe in FIG. 5B, when the subset of microphone elements 102 in the middle segments 204 have been selected to have a weight of 75% applied to the magnitude of the audio signals of the subset, and the subset of microphone elements 102 in the outer segments 206 have been selected to have a weight of 25% applied to the magnitude of the audio signals of the subset. In this scenario, no weighting is applied to the microphone elements 102 in the centerline 200 and the inner segments 202. FIG. 5D shows a lobe with a wider shape than the lobe in FIG. 5C, when the subset of microphone elements 102 in the middle segments 204 have been selected to have a weight of 50% applied to the magnitude of the audio signals of the subset. In this scenario, no weighting is applied to the microphone elements 102 in the centerline 200 and the inner segments 202, and the microphone elements 102 in the outer segments 206 are not active.

Figure 5E:
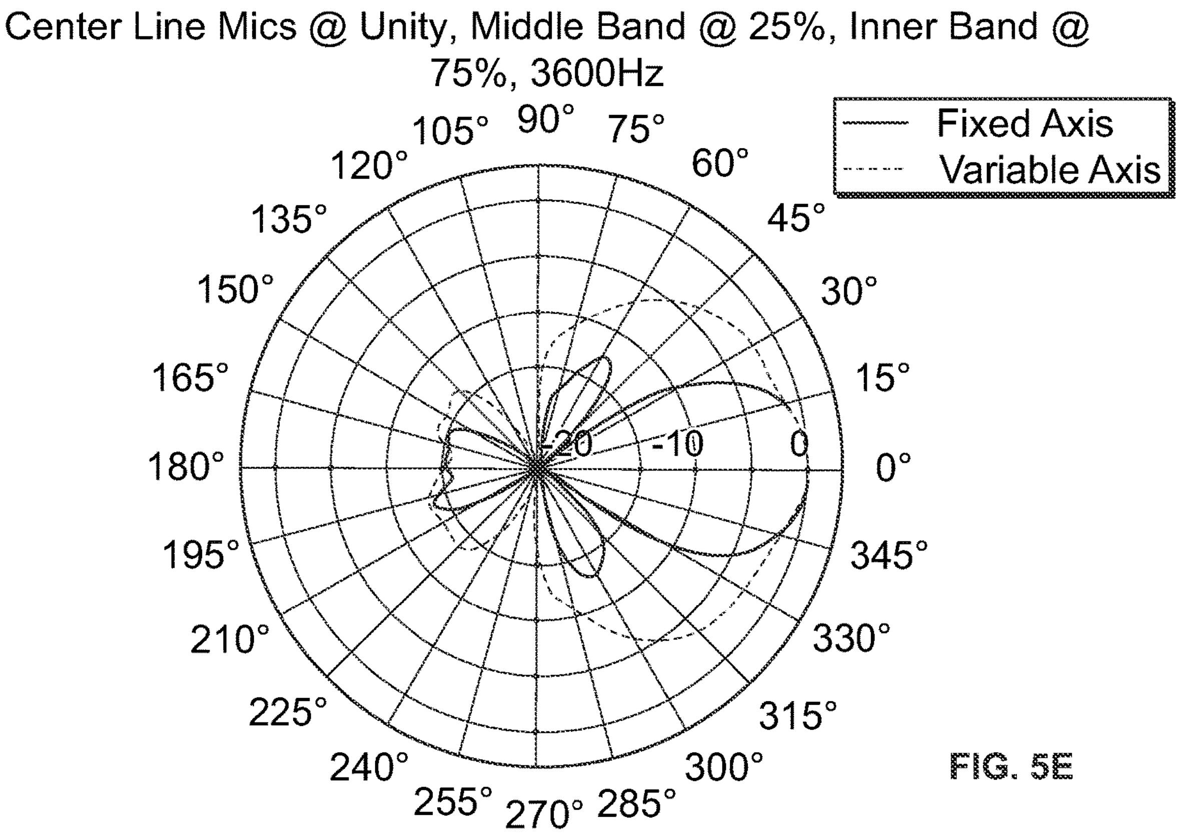
Figure 5F:
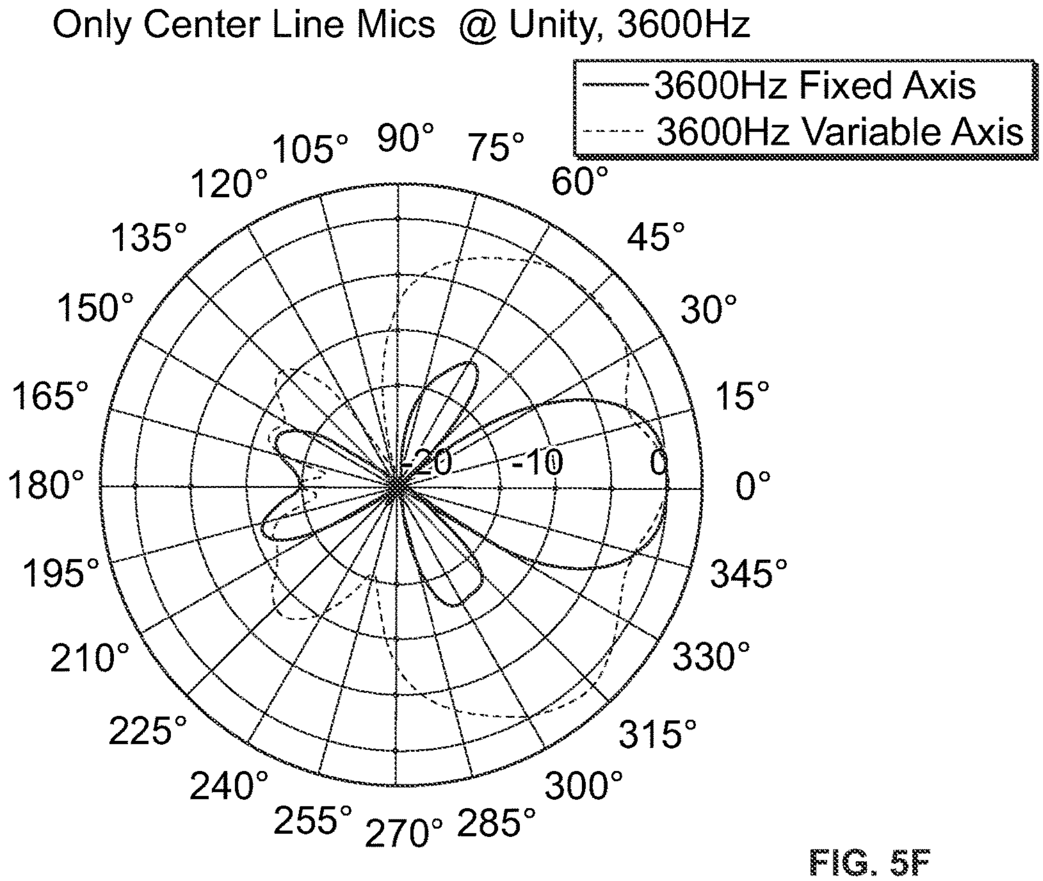

FIG. 5E shows a lobe with a wider shape than the lobe in FIG. 5D, when the subset of microphone elements 102 in the middle segments 204 have been selected to have a weight of 25% applied to the magnitude of the audio signals of the subset, and the subset of microphone elements 102 in the inner segments 202 have been selected to have a weight of 75% applied to the magnitude of the audio signals of the subset. In this scenario, no weighting is applied to the microphone elements 102 in the centerline 200, and the microphone elements 102 in the outer segments 206 are not active. FIG. 5F shows a lobe with a wider shape than the lobe in FIG. 5E, when only the microphone elements 102 in the centerline 200 have been selected and have no weighting applied, and the microphone elements 102 in the inner segments 202, middle segments 204, and outer segments 206 are not active.

Figure 4:
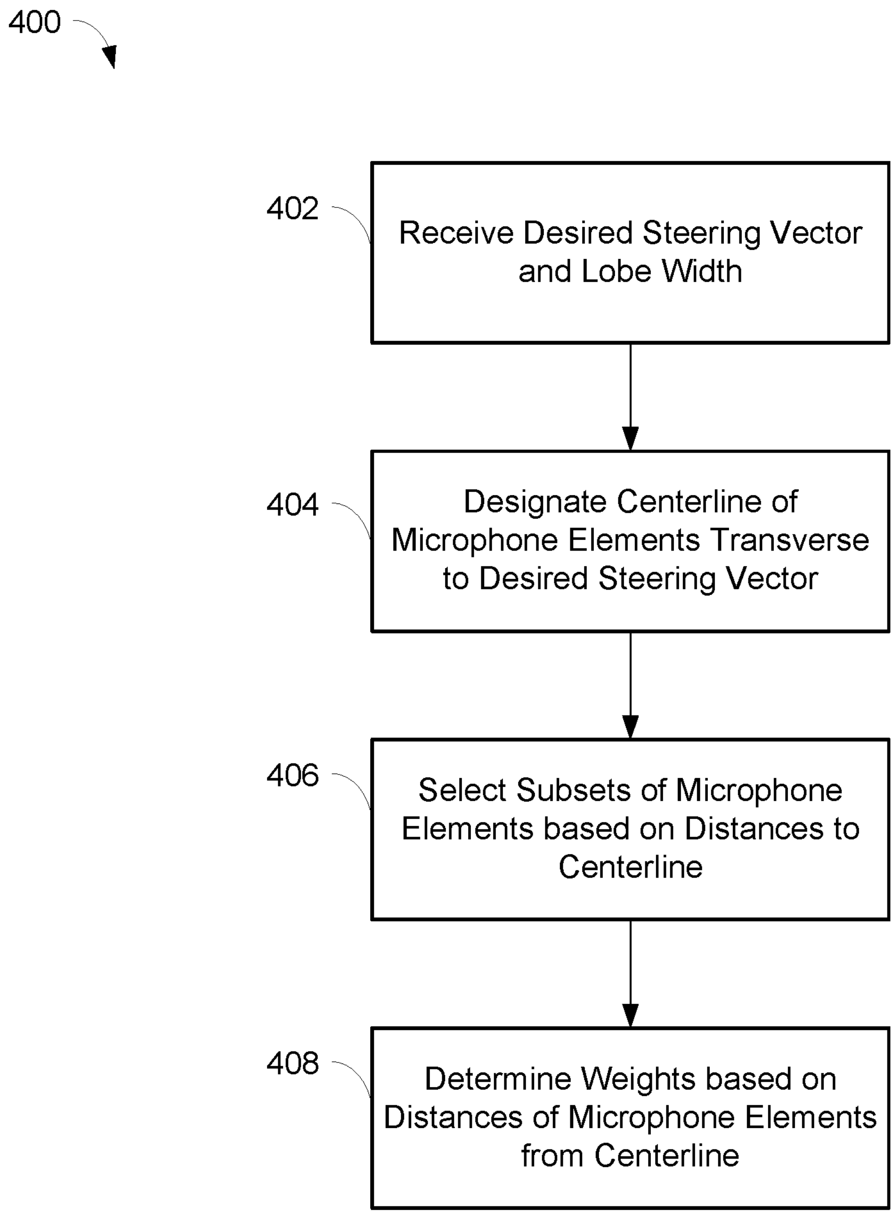
FIG. 4 is a flowchart illustrating operations for selecting a subset of microphone elements in an array microphone for adjusting lobe shapes, in accordance with some embodiments.

In some embodiments, the subset of microphone elements 102 that are selected when adjusting lobe shape may be determined by the process 400 shown in FIG. 4, such as at step 308 of the process 300 shown in FIG. 3. One or more processors 150 and/or other processing components (e.g., analog to digital converters, encryption chips, etc.) within or external to the microphone may perform any, some, or all of the steps of the process 400. One or more other types of components (e.g., memory, input and/or output devices, transmitters, receivers, buffers, drivers, discrete components, etc.) may also be utilized in conjunction with the processors 150 and/or other processing components to perform any, some, or all of the steps of the process 400.

At step 402, the desired steering vector and a desired shape for a lobe may be received at the processor 150. As described above, the desired steering vector and desired shape may be determined programmatically, in some embodiments, or entered at a user interface 170 in communication with the processor 150, in other embodiments. At step 404, the processor 150 may designate a centerline of the microphone elements 102 that is transverse to the desired steering vector. At step 406, one or more subsets of the microphone elements 102 may be selected for purposes of the lobe shape adjustment, where the subsets are selected based on the perpendicular distance of the subsets from the centerline designated at step 404. The subset(s) of the microphone elements 102 may be selected on a per microphone element basis or selected by segmented the microphone elements 102, as described above. In embodiments, the selection of the subsets of microphone elements 102 may be performed using a nearest neighbor search along the centerline. At step 408, the weight for each of the microphone elements 102 in a subset may be determined, based on the distances of the microphone elements 102 from the centerline designated at step 404.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. An array microphone, comprising:

a plurality of microphone elements, each microphone element of the plurality of microphone elements configured to detect sound and output an audio signal; and a processor in communication with the plurality of microphone elements, the processor configured to:

receive the audio signal from each microphone element of the plurality of microphone elements;

form one or more lobes of a pickup pattern of the array microphone based on combining the audio signals, using a beamforming technique; and apply a weight to a magnitude of each audio signal of one or more subsets of microphone elements of the plurality of microphone elements such that the beamforming technique is altered to result in asymmetrically adjusting, about a steering vector, a shape of the one or more lobes of the pickup pattern of the array microphone, wherein the weight is based on a frequency of sound to be detected by the one or more subsets of microphone elements of the plurality of microphone elements.

2. The array microphone of claim 1, wherein the beamforming technique comprises a delay and sum beamforming technique.

3. The array microphone of claim 2, wherein the processor is configured to apply the weight to the magnitude of each audio signal of the one or more subsets of microphone elements of the plurality of microphone elements such that the delay and sum beamforming technique is altered resulting in the adjusting of the shape of the one or more lobes.

4. The array microphone of claim 1, wherein the adjusting of the shape of the one or more lobes is independent of the steering vector associated with the one or more lobes.

5. The array microphone of claim 1, wherein the processor is configured to apply the weight by applying the weight based on a distance of the one or more subsets of microphone elements from a centerline of the plurality of microphone elements, wherein the centerline is transverse to at steering vector associated with the one or more lobes.

6. The array microphone of claim 1, wherein the processor is further configured to automatically determine the steering vector and a desired shape.

7. The array microphone of claim 1, further comprising a user interface in communication with the processor, wherein the processor is further configured to receive the steering vector from the user interface.

8. The array microphone of claim 1, further comprising a user interface in communication with the processor;

wherein:

the processor is further configured to receive a desired shape of the one or more lobes from the user interface; and the processor is configured to apply the weight by applying the weight to the magnitude of the audio signal of one or more subsets of microphone elements of the plurality of microphone elements such that the shape of the one or more lobes is adjusted to the desired shape.

9. The array microphone of claim 1:

further comprising a database in communication with the processor, wherein the database comprises a plurality of weights corresponding to differing shapes of the one or more lobes;

wherein the processor is further configured to retrieve the weight for the shape of the one or more lobes from the database.

10. The array microphone of claim 1, wherein the plurality of microphone elements are arranged in a number of concentric, nested rings of varying sizes, each ring comprising a subset of the plurality of microphone elements positioned at predetermined intervals along a circumference of the ring.

11. The array microphone of claim 10, wherein the concentric, nested rings are rotationally offset from each other.

12. The array microphone of claim 10, wherein the rings are positioned at different radial distances from a central point of a substrate to form a nested configuration.

13. The array microphone of claim 10, wherein each of the rings forms a circle with a different diameter.

14. The array microphone of claim 13, wherein the diameter of each ring is determined based on a lowest operating frequency assigned to the subset of the plurality of microphone elements included in the ring.

15. The array microphone of claim 10, wherein the rings of microphone elements are configured to cover a preset range of audio frequencies.

16. A method, comprising:

receiving an audio signal from each of a plurality of microphone elements;

forming one or more lobes of a pickup pattern of an array microphone based on combining the audio signals, using a beamforming technique; and applying a weight to a magnitude of each audio signal of one or more subsets of microphone elements of the plurality of microphone elements such that the beamforming technique is altered to result in asymmetrically adjusting, about a steering vector, a shape of the one or more lobes of the pickup pattern of the array microphone, wherein the weight is based on a frequency of a sound to be detected by the one or more subsets of microphone elements of the plurality of microphone elements.

17. The method of claim 16, wherein the beamforming technique comprises a delay and sum beamforming technique.

18. The method of claim 17, wherein applying the weight comprises applying the weight to the magnitude of each audio signal of the one or more subsets of microphone elements of the plurality of microphone elements such that the delay and sum beamforming technique is altered resulting in the adjusting of the shape of the one or more lobes.

19. The method of claim 16, wherein the adjusting of the shape of the one or more lobes is independent of the steering vector associated with the one or more lobes.

20. The method of claim 16, wherein applying the weight comprises applying the weight based on a distance of the one or more subsets of microphone elements from a centerline of the plurality of microphone elements, wherein the centerline is transverse to the steering vector associated with the one or more lobes.

* * * * *